(12) United States Patent
Wienhold

(10) Patent No.: US 8,844,940 B2
(45) Date of Patent: *Sep. 30, 2014

(54) DUAL SIZE TOOL-BIT HOLDER

(71) Applicant: Insty-Bit, LLC, Minneapolis, MN (US)

(72) Inventor: James L. Wienhold, Minneapolis, MN (US)

(73) Assignee: Insty-Bit, LLC, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/657,183

(22) Filed: Oct. 22, 2012

(65) Prior Publication Data

US 2014/0027987 A1 Jan. 30, 2014

Related U.S. Application Data

(63) Continuation of application No. 13/022,158, filed on Feb. 7, 2011, now Pat. No. 8,292,304, which is a continuation of application No. 10/592,868, filed as application No. PCT/US2005/008720 on Mar. 15, 2005, now Pat. No. 7,896,355.

(60) Provisional application No. 60/553,581, filed on Mar. 15, 2004.

(51) Int. Cl.
*B23B 31/22* (2006.01)
*B25B 23/00* (2006.01)
*B23B 31/107* (2006.01)
*B25B 21/00* (2006.01)

(52) U.S. Cl.
CPC .............. *B25B 23/0035* (2013.01); *B23B 31/22* (2013.01); *B23B 2231/0232* (2013.01); *B23B 2231/38* (2013.01); *B23B 31/1071* (2013.01); *B25B 21/007* (2013.01); *Y10S 279/905* (2013.01)
USPC ................................ 279/22; 279/75; 279/905

(58) Field of Classification Search
CPC ................ B23B 31/22; B23B 31/1071; B23B 2231/0232; B23B 2231/38
USPC ......... 279/14, 22, 29, 30, 74, 75, 76, 82, 137, 279/144, 156, 905
IPC ....................................................... B23B 31/22
See application file for complete search history.

(56) References Cited

U.S. PATENT DOCUMENTS 423,386 A * 3/1890 Miller .............................. 279/37
656,357 A * 8/1900 Kramer ........................... 279/37

(Continued)

FOREIGN PATENT DOCUMENTS

WO 02/064295 8/2002

OTHER PUBLICATIONS

European Communication from EP Application No. 05 725 716.4 dated May 18, 2010, 4 pages.

(Continued)

*Primary Examiner* — Eric A Gates
(74) *Attorney, Agent, or Firm* — James L. Young; Westman, Champlin & Koehler, P.A.

(57) ABSTRACT

A tool-bit holder (10) for varying tool-bit shank profiles comprising a hub (12) having a longitudinal bore (28) adapted for receiving a tool-bit shank (66, 70, 80). The hub (12) has a plurality of radial slots (38) communicating with the first section (30) of the longitudinal bore (28). The tool-bit holder (10) has a collar (14) fixedly attached to the hub (12) adjacent the open (29) and disposed annularly about the hub (12). A sleeve (16) is axially slidably mounted and disposed annularly about the hub (12). The sleeve (16) has a plurality of radial bores (48), each being in communication with a respective radial slot (38) of the hub (12) with a detent ball (18) disposed within each. A spring (20) is provided for biasing the sleeve (16) towards the open end (29) wherein the detent ball (18) engages an inner ramp face (46) of the collar (14).

19 Claims, 4 Drawing Sheets

(56) References Cited

U.S. PATENT DOCUMENTS

| | | | |
|---|---|---|---|
| 967,837 A * | 8/1910 | Schade | 279/56 |
| 1,184,758 A * | 5/1916 | Leland | 279/56 |
| 2,135,861 A | 11/1938 | Thompson | |
| 2,448,817 A * | 9/1948 | McArthur | 403/321 |
| 3,240,520 A * | 3/1966 | Dailey et al. | 403/325 |
| 3,599,996 A * | 8/1971 | Holt | 279/37 |
| 3,767,217 A * | 10/1973 | Jensen | 279/56 |
| 4,032,163 A * | 6/1977 | Holt | 279/37 |
| 4,577,875 A | 3/1986 | Miyakawa | |
| 4,900,202 A | 2/1990 | Wienhold | |
| 5,013,194 A | 5/1991 | Wienhold | |
| 5,062,749 A | 11/1991 | Sheets | |
| 5,417,527 A | 5/1995 | Wienhold | |
| 5,466,101 A | 11/1995 | Meyen | |
| 5,470,180 A | 11/1995 | Jore | |
| 5,722,805 A | 3/1998 | Giffin | |
| 5,779,404 A | 7/1998 | Jore | |
| 6,176,654 B1 | 1/2001 | Jore | |
| 6,270,085 B1 | 8/2001 | Chen et al. | |
| 6,302,408 B1 | 10/2001 | Zierpka | |
| 6,325,393 B1 | 12/2001 | Chen et al. | |
| 6,347,914 B1 | 2/2002 | Boyle et al. | |
| 6,394,715 B1 | 5/2002 | Boyle et al. | |
| 6,457,916 B2 | 10/2002 | Wienhold | |
| 6,561,523 B1 | 5/2003 | Wienhold | |
| 6,616,149 B1 | 9/2003 | Pjevach et al. | |
| 6,722,667 B2 | 4/2004 | Cantlon | |
| 6,874,791 B2 | 4/2005 | Chen et al. | |
| 6,966,562 B1 | 11/2005 | Wienhold | |
| 2001/0042964 A1 | 11/2001 | Bedi | |
| 2004/0013485 A1 | 1/2004 | Zierpka | |
| 2004/0111804 A1 | 6/2004 | Fan-Chiang | |

OTHER PUBLICATIONS

Supplementary European Search Report from correspondence European Patent Application No. 05 72 5716, dated Jun. 12, 2009, 2 pages.

* cited by examiner

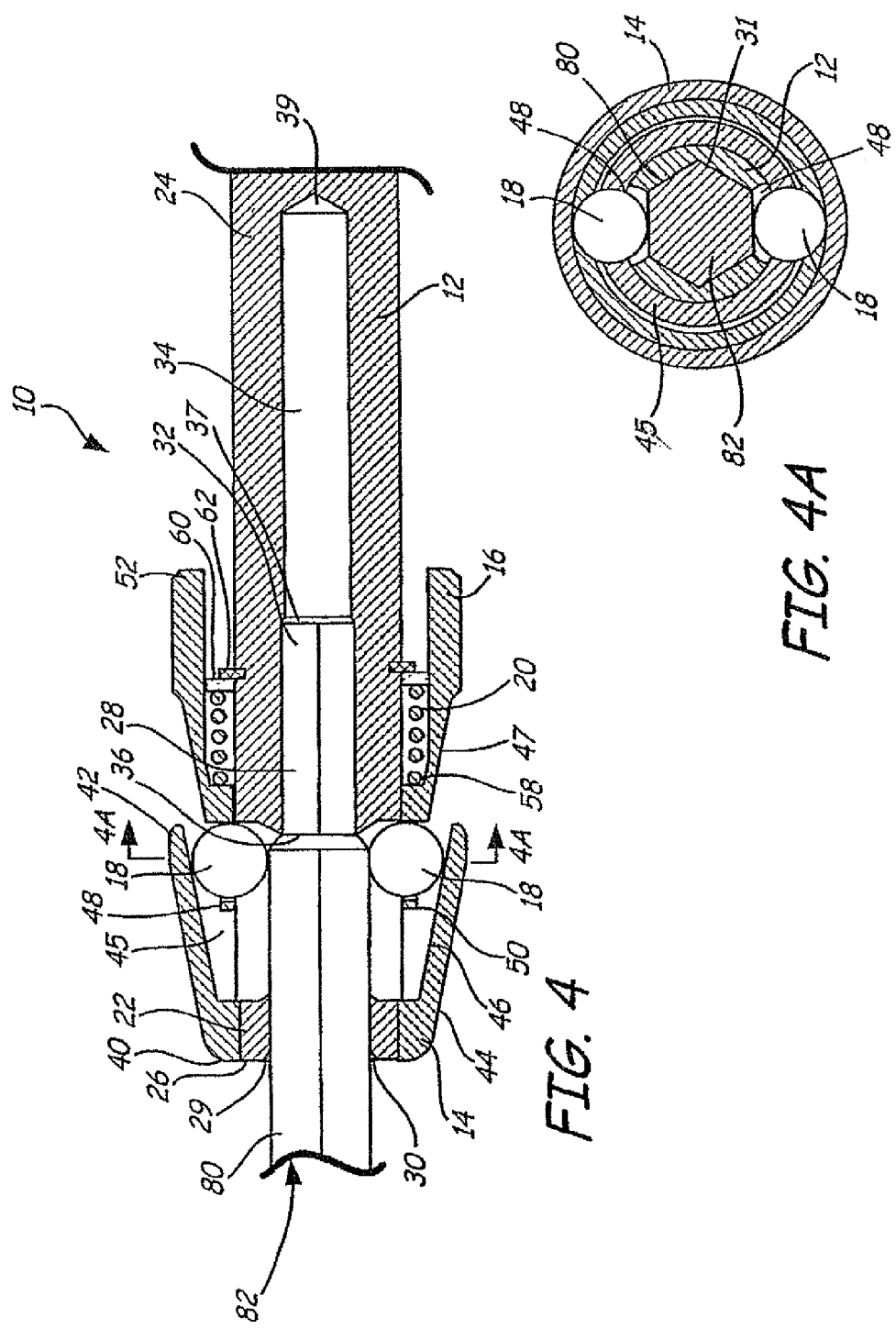

DUAL SIZE TOOL-BIT HOLDER

CROSS-REFERENCE TO RELATED APPLICATION

The present application is a continuation of and claims priority of U.S. patent application Ser. No. 13/022,158, filed Feb. 7, 2011, which is a continuation of U.S. patent application Ser. No. 10/592,868, filed Sep. 14, 2006, which is a 371 of international application PCT/US2005/008720, filed Mar. 15, 2005, and which is a non-provisional of 60/553,581, filed Mar. 15, 2004, the contents of which are hereby incorporated by reference in their entireties.

BACKGROUND OF THE INVENTION

This invention relates to chuck assemblies for tool-bits, and more particularly, to a quick release chuck adapted to receive and retain a plurality of tool-bits having varying shank cross-sectional sizes.

Tool-bits include tools used for drilling and driving fastener devices such as screws, nuts and bolts, and other work elements requiring rotational motion. The traditional or "incremental" design typically consists of a mechanism that houses three adjustable jaws which protrude at an angle into a bore. An external sleeve is coupled to the jaws via internal gear teeth. When a tool shank is inserted into the bore, the sleeve is rotated by a user. As the sleeve is rotated in one direction, the jaws are forced towards the center of the bore to clamp a tool-bit and tighten the sleeve into place (e.g. using a chuck key). When the sleeve is rotated in the opposite direction, the jaws are opened. This chuck style is able to accommodate a variety of tool shank sizes and shapes. However, changing a tool-bit takes time and extensive operator involvement.

Tools having an alternate approach to chuck design allow for toot-bits to be exchanged in a "quick-change" manner. The American National Standards Institute has a specification for such tools known as ANSI B 107.41982, which refers to driving and spindle ends for portable powered and handheld machines which use tool-bits. Tool-bits in accordance with the standard have a hexagonally configured shank. The standard reflects an alternate and pervasive use of such tool-bits and the large inventory of tools available.

One type of quick-change or quick-release chuck uses a spring biased sleeve disposed on a spindle or hub, as described in U.S. Pat. Nos. 4,900,202 and 5,013,194. Quick-release chucks of this type require the use of tools that have shanks of a consistent size (typically, ¼" hex shank), usually having hexagonal cross sections. A spring biased sleeve is used to retain the tool-bit in the chuck. The sleeve urges a detent ball into contact with the shank of the tool-bit and maintains the ball in position by a shoulder (or cam surface) mounted on the sleeve. The ball is urged into contact with the shank and maintained in position by a compression spring disposed between the spindle and the sleeve. A ring secured to the hub limits movement of the sleeve in one direction, and the compression spring limits movement of the sleeve in the opposite direction.

The tool-bit is prevented from being axially extracted from the chuck by the ball. The spring biased shoulder is urged against the detent ball which locks it against a retaining face on the tool-bit. Attempting to extract the tool-bit from the bore without release of the ball pulls the ball against the retaining face. The resulting force prevents extraction of the tool-bit from the shank receiving bore. To release the tool-bit from the receiving bore, the user must retract the sleeve. The retracted sleeve acts to compress the spring, which removes the shoulder from engagement with the ball and thereby allows the ball to move out of contact with the tool-bit. Thus, quick-release chucks allow for an operator to easily and quickly insert and remove tool-bits from the chuck without requiring the use of a chuck key or requiring the loosening or tightening of jaws onto the shank of the tool-bit.

Previous quick-release systems are only able to accommodate a single cross-sectional size tool-bit shank. Thus, in order to provide sufficient rotational torque, the cross-sectional size of the receiving bore of the quick release chuck must be substantially the same as the cross-sectional size of the tool-bit shank in order for the quick-release chuck to rotate the tool-bit as the chuck rotates. A quick-release chuck assembly is needed in the art which quickly and efficiently exchanges tool-bits having different cross-sectional sizes.

SUMMARY

A tool-bit holder for varying tool-bit shank profiles, the tool-bit holder comprising a hub having a longitudinal bore adapted for receiving a tool-bit shank. The longitudinal bore comprises a first section having a first profile and a first length, and a smaller second section having a second profile and second length. The hub has a plurality of radial slots communicating with the longitudinal bore. A collar is fixedly attached to the hub and disposed annularly about the hub and forms a channel over each radial slot. A sleeve is axially slidably mounted along the hub. The sleeve has a plurality of radial bores corresponding to the slots of the hub with a detent ball is disposed within each of the radial bores. The tool-bit holder also comprises at least one inner ramp face for engaging each detent ball. A spring is provided for biasing the sleeve along the hub between a locking position and a retracting position.

The above summary is not intended to describe each disclosed embodiment or every implementation of the present invention. The figures and the detailed description which follow more particularly exemplify illustrative embodiments.

BRIEF DESCRIPTION OF THE DRAWINGS

The present invention will be further explained with reference to the attached figures, wherein like structure is referred to by like numerals throughout the several views.

FIG. 1A is a cross-sectional view taken along line 1A of FIG. 1.

FIG. 4 is a longitudinal cross-sectional view of the tool-bit holder with a third tool-bit therein.

FIG. 4A is a cross-sectional view taken along line 4A of FIG. 4.

While the above-identified drawing figures set forth one embodiment of the invention, other embodiments are also contemplated, as noted in the discussion. In all cases, this disclosure presents the present invention byway of representation and not limitation. It should be understood that numerous other modifications and embodiments can be devised by those skilled in the art which fail within the scope and spirit of the principles of this invention.

DETAILED DESCRIPTION

Figure 1:
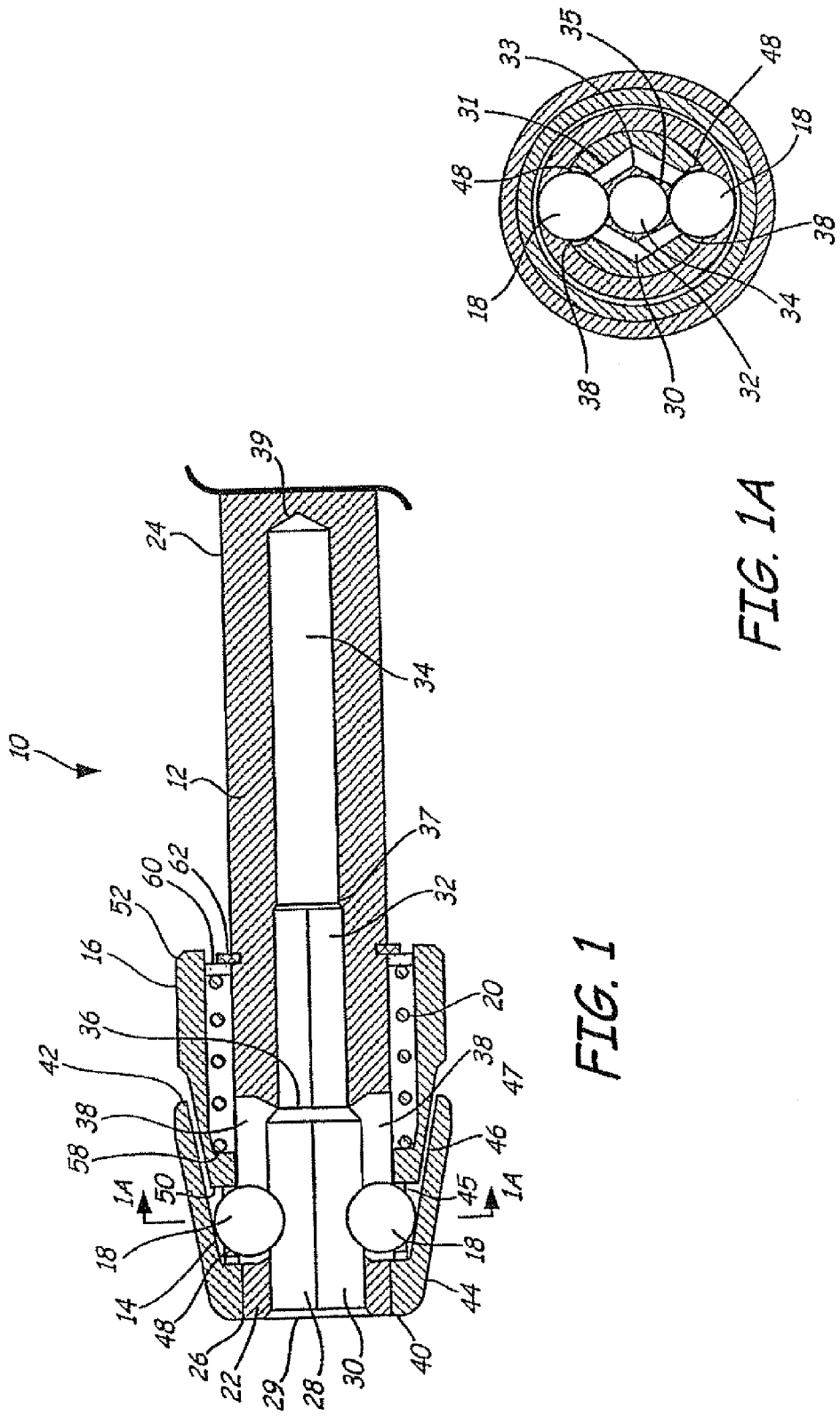
FIG. 1 is a longitudinal cross-sectional view of a tool-bit holder of the present invention.

The present invention is a tool-bit holder for capturing and retaining a tool-bit that has a quick release mechanism. A first embodiment of an automatic tool-bit holder is shown in FIG. 1. The tool-bit holder 10 includes a hub 12, a collar 14, a sleeve 16, detent balls 18 and a spring 20. FIG. 1A is a cross-sectional view taken along line 1A of FIG. 1.

The hub 12 has a forward distal end 22, ending in a forward face 26, and a rear proximal end 24. Preferably, the proximal end 24 of the hub 12 is shaped to provide a connection to a chuck for a power tool. Alternatively, the proximal end 24 is a spindle that provides a connection to other devices such as tools used for drilling and driving. The proximal end 24 typically has a hexagonally-shaped cross-section.

A longitudinal bore 28 extends perpendicularly into the forward face 26 and axially toward the proximal end 24 of the hub 12. The longitudinal bore comprises a first bore section 30, which has an open end 29. The first bore section 30 is of a first profile 31, preferably hexagonally-shaped (See FIG. 1A) and able to receive a tool with a ⅜" tool shank. Connected to the first bore section 30 is second bore section 32, which terminates in the hub 12 at a terminating face 37. The second bore section 32 is of a second profile 33, preferably hexagonally-shaped and able to receive a ¼" tool shank, that is of an area less than that of the profile 31 of the first bore section 30. An intermediary radial face 36 separates the first bore section 30 from the second bore section 32. Adjacent the opposite side of the second bore section is a third bore section 34. The third bore 34 section is of a third profile 35, (e.g. circular-shaped with approximately a ¼" diameter), that is of an area less than that of the profile of the second bore section 32. A radial terminating face 37 separates the second bore section 32 from the third bore section 34. The third bore section terminates in the hub 12 at the limiting face 39.

The longitudinal bore 28 is substantially aligned along the longitudinal axis of the hub 12 and is shaped to admit the shank of different sized quick release tool-bits, such as ¼" and ⅜" commonly used in the industry. The terminating face 37 and limiting face 39 extend substantially perpendicular to the longitudinal axis of the hub 12, although a person skilled in the art would realize that said faces 37 and 39 may have a concavity due to the boring process. The third bore section 34 is made to receive a tool end on a dual sided tool-bit, such as a twist drill bit. In a second embodiment (not illustrated), the longitudinal bore contains only a first bore section 30 and second bore section 32.

The hub 12 has a radial slots 38 located along the longitudinal axis of the hub 12 and the radial slots 38 are preferably aligned to extend substantially perpendicular to the longitudinal axis of the hub 12. The radial slots 38 extend completely through the hub 12 such that the radial slots 38 communicate with the longitudinal bore 28.

The collar 14 is fixedly attached to the hub 12 forward of the radial slots 38 adjacent the open end 29 of the longitudinal bore 28 and is disposed annularly about the hub 12. The collar 14 has a forward face 40 at the distal end 22 of hub 12 extending radially outwardly from the longitudinal axis of the hub 12 and, in one embodiment, forms one continuous plane with the forward face 26 of the hub 12. The collar 14 also has a proximal end 42. As shown in FIG. 1, the proximal end 42 is ramped up from the collar 14 20 (radially away and rearwardly), although a person skilled in the art would realize that the proximal end 42 could be stepped up (out and away) from the collar 14 as well. The collar 14 contains an exterior surface 44 and an inner ramp face 46 which extends radially outwardly and axially rearwardly from the longitudinal axis of the hub 12. The angle of the inner ramp surface 46 may be as low as 25 about 4 degrees or as high as about 10 degrees, relative to the central axis of the longitudinal bore, and in one embodiment the angle of the inner ramp surface 46 is 7 degrees. The inner ramp face 46 of the collar 14 forms a channel 45 that lies substantially proximate to the radial slot 38 of the hub 12.

The sleeve 16 is slidably mounted along the hub 12. The sleeve 16 is disposed annularly about the hub 12. The sleeve 16 also has a forward end 50 and rearward end 52. The sleeve 16 has a ramped outer surface 47 (extending radially away and rearwardly) corresponding to the inner ramp surface 46 of the collar 14. The sleeve 16 lies at least partially within the channel 45 created by the inner ramp surface 46 of the collar 16 such that the sleeve 16 axially slides along the hub 12 and within the channel 45. The sleeve 16 has radial bores 48 in communication with the radial slots 38 of the hub 12. With no tool-bit inserted into the tool-bit holder 10, the sleeve 16 assumes a first position as shown in FIG. 1.

The detent balls 18 are disposed within the radial bores 48 of the sleeve 16 and the radial slots 38 of the hub 12, which are circumferentially. 10 aligned. The inner ramp surface 46 of the collar 14 prevents the detent balls 18 from leaving their respective positions and completely falling radially out of the tool-bit holder 10. The diameter of the detent balls 18 is greater than the widths of the radial slots 38 of the hub 12 (at its radially inner end), thereby preventing the detent balls 18 from completely falling radially into the longitudinal bore 28. The diameter of the detent balls 18 is such that when the tool holder 10 is in the unloaded position, the balls extend into the area of the second profile 33 of the second bore section 32 (See FIG. 1A.)

The spring 20 is disposed between a shoulder 58 of the sleeve 16 and a washer 60 which is fixed relative to the hub 12. The spring 20 is of 20 the compression spring type, such that the spring 20 biases the sleeve 16 axially toward the open end 29 of the longitudinal bore 28. A retaining clip 62 is received in a circumferential groove in the hub 12 outer wall, and thus prevents the washer 60 from moving toward the distal end 24 of the hub 12. When the sleeve 16 is urged towards the open end 29 of the longitudinal bore 25 28, the detent balls 18 in the radial bores 48 of the sleeve 16 oppose the bias of the spring 20 and engage the inner ramp face 46. The inner ramp face 46 extends radially outwardly and toward the terminating face 37 of the longitudinal bore 28. The sleeve 16 is slidably positionable along the hub 12 between a locking position and a retracting position (or a tool-bit loading position and unloading position). When the sleeve 16 is in the loaded position, the spring 20 is less compressed than when the sleeve 16 is in the unloading position.

Figure 2:
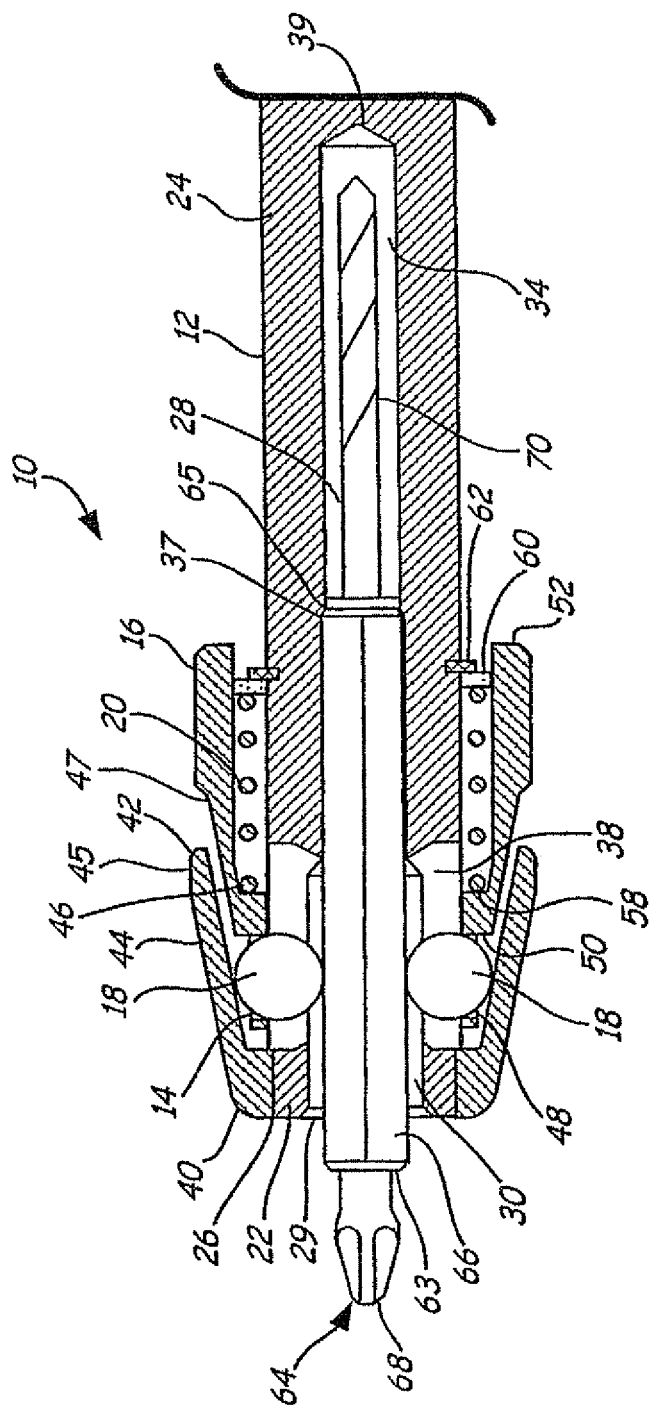
FIG. 2 is a longitudinal cross-sectional view of the tool-bit holder with a first tool-bit therein.

FIG. 1 illustrates a sectional view of the tool-bit holder 10 while it is in the unloaded position prior to insertion of a tool-bit shank into the longitudinal bore 28. The tool-bit holder 10 stays in the unloaded position until a tool-bit shank comes in contact with the detent balls 18 as the shank enters the longitudinal bore 28 (as shown in FIG. 2). While the tool-bit holder 10 is in the unloaded position, the spring 20 urges the sleeve 16 axially towards the distal end 22 of the hub 12. The detent ball 18 rides along with the sleeve 16 in the radial slots 38, 48. The detent ball 18 is urged radially inwardly along the inner ramp face 46 until it can go no further and stops the sleeve 16 from further 10 axially forward movement along the hub 12. The detent balls 18 are prevented from completely falling radially into the longitudinal bore 28 by the radial slots 38 of the hub 12 because the diameter of the detent balls 18 are greater than the width of their respective radial slots 38 (at the radially innermost end of each slot 38).

FIG. 2 illustrates a sectional view of the tool-bit holder 10 previously described in FIG. 1 in the loaded position as a shank 66 of a tool-bit 64 is inserted in the longitudinal bore 28. The tool-bit 64 in this embodiment contains a first tool end 68, a shank 66, and a second tool end 70. In the embodiment illustrated, the first tool end 68 is a screw bit and the second tool 20 end 70 comprises a twist drill bit. The shank 66 connects the two tool ends 68, 70, and is hexagonally-shaped in radial cross-section. The shank 66 is of a profile that corresponds to the second profile 33 of the second bore section 32. A distal end face 65 of the tool-bit 64 between the second tool end 70 and the shank 66 rests on terminating face 37 of the longitudinal bore 28. The third bore section 34 houses the second tool end 70 of the tool-bit 64. If the tool was inserted the opposite direction, a distal end face 63 would rest on the terminating face 37 of the longitudinal bore, and the third bore section 34 would house the first tool end 68.

The shank 66 comes in contact with the detent balls 18 and urges, the detent balls 18 radially outwardly against the inner ramp face 46. This in turn forces the sleeve 16 to slide axially rearward towards the proximal end 24 of the hub 12 (into a second position as shown in FIG. 2). The detent balls 18 ride in the radial bore 48 of the sleeve 16 along the shank 66. The spring 20 compresses as the sleeve 16 slides axially rearward toward the proximal end 24, while exerting a force on the detent balls 18 to hold the shank 66 in place. The detent balls 18 extend in to the first bore section 30 of the longitudinal bore 28. The detent balls 18 are equally spaced about the central axis of the longitudinal bore 28 to provide equal pressure on the faces of the shank 66 contacted by the detent balls. Although illustrated as two detent balls 18 spaced 180 degrees apart, those skilled in the art will recognize additional detent ball and corresponding slot 38 and bore 48 geometries maybe utilized such as three detent balls space 120 degrees apart for holding a hexagonally shaped shank 66, or four detent balls spaced 90 degrees apart for gripping a square shank.

Figure 3:
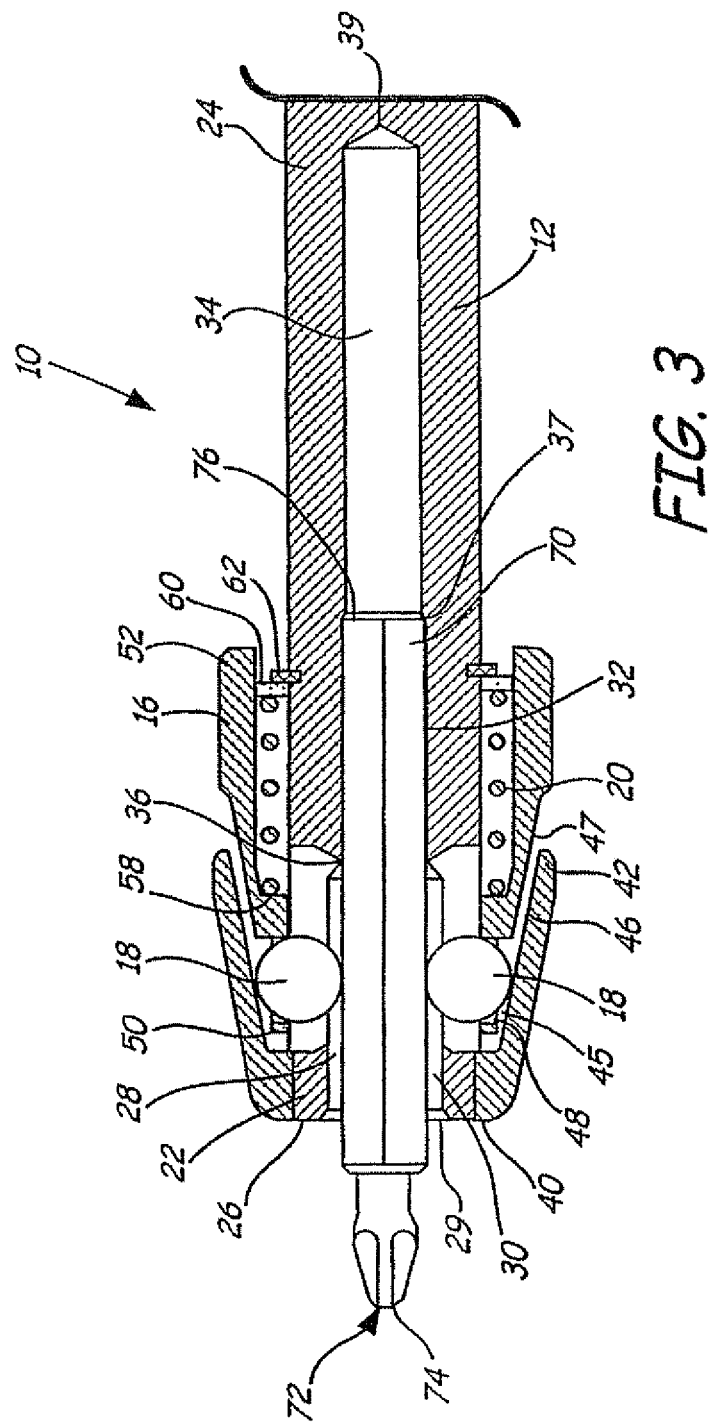
FIG. 3 is a longitudinal cross-sectional view of the tool-bit holder with a second tool-bit therein.

FIG. 3 illustrates a sectional view of the tool-bit holder 10 previously described in FIG. 1 in the loaded position as a shank 70 of a tool-bit 72 is inserted in the longitudinal bore 28. The tool-bit 72 in this embodiment contains a first tool end 74, a shank 70, and a shank end face 76. In the embodiment illustrated, the first tool end 74 is a screw bit. The shank 70 is of a profile that corresponds to the second profile of the second bore section 32. The shank end face 76 of the tool-bit 72 rests oh terminating face 37 of the longitudinal bore 28. In this embodiment, the third bore section 34 is superfluous and may be eliminated. As in FIG. 2, the shank 70 comes in contact with the detent balls 18 and urges the detent balls 18 radially outwardly against the inner ramp face 46 while the spring 20 exerts a force back to hold the shank 70 in place. The sleeve 16 is placed in its second position, as in FIG. 2.

FIG. 4 illustrates a sectional view of the tool-bit holder 10 previously described in FIG. 1 in the loaded position as a shank 80 of a tool-bit 82 of a different size is inserted in the longitudinal bore 28. The tool-bit 82 in 30 this embodiment contains a shank 80 of a hexagonal shape. The shank 80 is of a profile that corresponds to the first profile 31 of the first bore section 30 (See FIG. 4A). A shank end face 84 of the tool-bit 82 rests on intermediary face 36 of the longitudinal bore 28, which prevents the tool from being inserted into the second bore section 32. In this embodiment, the third bore section 34 is superfluous and may be eliminated. The shank 80 comes in contact with the detent balls 18 and urges the detent balls 18 radially outwardly against the inner ramp face 46. This in turn forces the sleeve 16 to slide axially rearward towards the proximal end 24 of the hub 12 into a third position, as shown in FIG. 4. The displacement of the sleeve 16 is greater than that in FIGS. 2 and 3, as the sleeve 16 needs to be at a greater distance from the inner ramp 10 surface 46 to allow the full diameter of the detent balls 18 to be displaced from the area within the first bore section 30 profile. The detent balls 18 ride in the radial bore 48 of the sleeve 16 along the shank 80. The spring 20 compresses as the sleeve 16 slides axially rearward toward the proximal end 24, while exerting a force on the detent balls 18 to hold the shank 80 in place. Additionally, the profile of the shank 80 corresponds to the profile of the first bore section 30. Thus, when the tool-bit holder is rotated, the tool-bit 82 is also rotated.

To remove any of the tool-bits 64, 72, or 82 from the tool-bit holder 10, the sleeve 16 is moved axially rearwardly along the hub 12 toward 20 the proximal end 24 of the hub 12 and against the bias force of the spring 20, thereby compressing the spring 20. Movement of the sleeve 16 is generally performed by the tool operator. As the sleeve 16 is moved axially rearwardly along the hub 12, the detent balls 18 riding in the radial bores 48 of the sleeve 16 can move radially outwardly along the inner ramp face 46, removing the 25 detent balls 18 from applicable profile of the applicable bore section 30 or 32. Once the detent ball 18 is removed from the bore section 30 or 32, the shank of the tool-bit is free to be released from the longitudinal bore 28. The tool-bit is removed by pulling the shank longitudinally toward the distal end 22 of the hub 12, thereby releasing the tool-bit from the tool-bit holder 10.

The present invention enables a user to quickly change a plurality of tool-bits having varying shank cross-sectional sizes in the same chuck assembly. A first tool-bit having a first profile which is locked within the hub of the present invention can be quickly and easily exchanged for a second tool-bit having a smaller second profile. Alternatively, the second tool-bit can be quickly and easily exchanged for the first tool-bit. The present invention chuck assembly offers a convenient and efficient way to change tool-bits with different cross-sectional profiles within the same chuck assembly. Additionally, the present inventive chuck also allows a user to quickly change a reversible tool-bit containing two different working tools on opposite ends with a shaft that has different sizes.

With the above described tool-bit holder, a method of quickly changing the size of tool-bits is provided. A first tool-bit of a first cross-sectional profile is inserted into a first section of a longitudinal bore of a tool-bit holder. The tool-bit is retained in the tool-bit holder with a plurality of detent balls engaged by a spring biased sleeve in a first position, and the detent balls are in communication with the first bore section. The spring biased sleeve is moved to a position that disengages the detent balls from the first position to remove the first tool bit. Next, a second tool-bit of a second profile is inserted into a second section of the longitudinal bore of the tool-bit holder. The second tool-bit occupies a portion of the first section of the longitudinal bore. The second tool-bit is retained within the tool-bit holder with the plurality of detent balls engaged by the spring in a second position. The first tool-bit is retained in the tool-bit holder at a different depth than the second tool bit. To remove the second tool bit, the spring biased sleeve is moved to a position that disengages the detent balls from the second position. In addition, a second end of the first tool bit within the tool-bit holder can be protected by providing a third section of the longitudinal bore.

Although the present invention has been described with reference to several embodiments, workers skilled in the art will recognize that changes may be made in form and detail without departing from the spirit and 30 scope of the invention.

The invention claimed is:

1. A tool-bit holder for varying tool-bit shank profiles, the tool-bit holder comprising:
   a hub having a longitudinal bore having an open end, the longitudinal bore having a first section having a first non-circular profile and a first length, and the longitudinal bore having a second section having a second non-circular profile and second length, the second profile of a smaller area than the first profile, and the hub having at least one radial slot communicating with the first section of the longitudinal bore;
   a collar fixedly attached to the hub adjacent the open end of the longitudinal bore and disposed annularly about the hub wherein a proximal end of the collar forms a channel over the radial slot;
   a sleeve axially slidably mounted along the hub and disposed annularly about the hub wherein the sleeve is at least partially within the channel and at least one radial bore, the radial bore of the sleeve being in communication with the radial slot of the hub;
   a shank engaging element disposed within the radial bore of the sleeve and the radial slot of the hub and the channel of the collar;
   at least one inner ramp face on the proximal end of the collar for engaging the shank engaging element wherein the inner ramp face extends radially outwardly and away from the open end of the longitudinal bore; and
   a spring biasing the sleeve towards the open end of the longitudinal bore wherein the shank engaging element in the radial bore of the sleeve engages the inner ramp face and the sleeve is slidably positionable along the hub between a locking position and a retracting position;
   wherein contact between a tool-bit shank having the second profile and the shank engaging element urges the shank engaging element radially outwardly against the at least one inner ramp face to a first extent and wherein contact between a tool-bit shank having the first profile and the shank engaging element urges the shank engaging element radially outwardly against the at least one inner ramp face to a second extent that is greater than the first extent.

2. The tool-bit holder of claim 1, and further comprising: at least one longitudinal face on the proximal end of the collar and aligned to prevent the shank engaging element from radial outward movement beyond its radial slot.

3. The tool-bit holder of claim 1 wherein when the sleeve is in the locking position the inner ramp face urges each the shank engaging element radially inwardly through the radial slot of the hub and against the bias of the spring such that the shank engaging element sits in a circumferential groove of a tool-bit shank corresponding to the first profile.

4. The tool-bit holder of claim 1 wherein when the sleeve is in the locking position the inner ramp face urges the shank engaging element radially inwardly through the radial slot of the hub and against the bias of the spring such that the shank engaging element engages a tool-bit shank corresponding to the second profile.

5. The tool-bit holder of claim 1 wherein when the sleeve is in the retracting position the sleeve urges the shank engaging element radially outwardly against the inner ramp face and out of a circumferential groove of a tool-bit shank corresponding to the first profile.

6. The tool-bit holder of claim 1 wherein when the sleeve is in the retracting position the sleeve urges the shank engaging element radially outwardly against the inner ramp face and out of engagement with a tool-bit shank corresponding to the second profile.

7. The tool-bit holder of claim 1 wherein the hub further comprises a spindle portion attached opposite the terminating face of the longitudinal bore.

8. The tool-bit holder of claim 7 wherein the spindle contains a third section of a third profile and third length of the longitudinal bore adjacent the second section and terminating face in the opposite direction of the first section, wherein the third profile is of an area less than the second profile.

9. The tool-bit holder of claim 1 wherein when the sleeve is in the locking position the inner ramp face urges the shank engaging element radially inwardly through the radial slot of the hub and against the bias of the spring such that the shank engaging element engages a tool-bit shank corresponding to the first profile.

10. The tool-bit holder of claim 1 wherein when the sleeve is in the retracting position the sleeve urges the shank engaging element radially outwardly against the inner ramp face and out of engagement with a tool-bit shank corresponding to the first profile.

11. A method of quickly changing the size of tool-bits in a tool-bit holder, the method comprising:
    inserting a first tool-bit of a first cross-sectional profile into a first section of a longitudinal bore of a tool-bit holder, the first section having the first cross-sectional profile;
    retaining the tool-bit in the tool-bit holder with a tool-bit engaging element engaged by a spring biased sleeve in a first position;
    sliding the spring biased sleeve to a position that disengages the tool-bit engaging element from the first position;
    removing the first tool bit;
    inserting a second tool-bit of a second profile into a second section of a longitudinal bore of the tool-bit holder, the second section having the second cross-sectional profile; and
    retaining the tool-bit within the tool-bit holder with the tool-bit engaging element engaged by the spring biased sleeve in a second position.

12. The method of claim 11 further comprising: sliding the spring biased sleeve to a position that disengages the tool-bit engaging element from the second position; and removing the second tool bit.

13. The method of claim 11 further comprising:
    protecting a second end of the first tool bit within the tool-bit holder in a third section of the longitudinal bore.

14. The method of claim 11 wherein the first tool-bit is retained in the tool-bit holder at a different depth than the second tool bit.

15. The method of claim 11 wherein the second tool-bit occupies a portion of the first section of the longitudinal bore.

16. The method of claim 11 wherein the tool-bit engaging element is in communication with the first bore section.

17. A tool-bit holder for varying tool-bit shank profiles, the tool-bit holder comprising:
    a hub having a longitudinal bore having an open end, the longitudinal bore having a first section having a first non-circular profile and a first length, and the longitudinal bore having a second section having a second non-circular profile and second length, the second profile of a smaller area than the first profile, and the hub having at least one radial slot communicating with the first section of the longitudinal bore;
    a collar fixedly attached to the hub adjacent the open end of the longitudinal bore and disposed annularly about the hub wherein a proximal end of the collar forms a channel over the radial slot;

a sleeve axially slidably mounted along the hub and disposed annularly about the hub wherein the sleeve is at least partially within the channel and at least one radial bore, the radial bore of the sleeve being in communication with the radial slot of the hub;

a shank engaging element disposed within the radial bore of the sleeve and the radial slot of the hub and the channel of the collar;

at least one inner ramp face on the proximal end of the collar for engaging the shank engaging element wherein the inner ramp face extends radially outwardly and away from the open end of the longitudinal bore; and a spring biasing the sleeve towards the open end of the longitudinal bore wherein the shank engaging element in the radial bore of the sleeve engages the inner ramp face and the sleeve is slidably positionable along the hub between a locking position and a retracting position;

wherein contact between a tool-bit shank having the second profile and the shank engaging element urges the shank engaging element radially outwardly against the at least one inner ramp face to a first extent, wherein contact between a tool-bit shank having the first profile and the shank engaging element urges the shank engaging element radially outwardly against the at least one inner ramp face to a second extent that is greater than the first extent, wherein the radial slot is one of a plurality of radial slots in the hub that are each in communication with the first section of the longitudinal bore, wherein the radial bore is one of a plurality of radial bores in the sleeve that are each in communication with a respective one of the radial slots in the hub, wherein the shank engaging element is one of a plurality of shank engaging elements disposed within each of the radial bores of the sleeve and its respective slot of the hub and the channel of the collar, wherein the inner ramp face on the collar engages each shank engaging element, wherein contact between the tool-bit shank having the second profile and each shank engaging element urges the shank engaging elements radially outwardly against the inner ramp face to a first extent, and wherein contact between the tool-bit shank having the first profile and each shank engaging element urges each shank engaging element radially outwardly against the inner ramp face to a second extent that is greater than the first extent.

18. The tool-bit holder of claim 17 wherein each shank engaging element and each respective radial slot and bore are equally spaced about an axis centered in the longitudinal bore.

19. A method of quickly changing the size of tool-bits in a tool-bit holder, the method comprising:

inserting a first tool-bit of a first cross-sectional profile into a first section of a longitudinal bore of a tool-bit holder, the first section having the first cross-sectional profile;

retaining the tool-bit in the tool-bit holder with a tool-bit engaging element engaged by a spring biased sleeve in a first position;

sliding the spring biased sleeve to a position that disengages the tool-bit engaging element from the first position;

removing the first tool bit;

inserting a second tool-bit of a second profile into a second section of a longitudinal bore of the tool-bit holder, the second section having the second cross-sectional profile; and retaining the tool-bit within the tool-bit holder with the tool-bit engaging element engaged by the spring biased sleeve in a second position;

wherein the tool-bit engaging element is one of a plurality of tool-bit engaging elements engaged by the spring biased sleeve when the sleeve is in its first and second positions.

\* \* \* \* \*